Dec. 26, 1933. F. R. WEST Re. 19,037

REFRIGERATOR CABINET

Original Filed May 17, 1933

INVENTOR.
FRANK R. WEST.

BY
Barnes, Kisselle & Langhlin
ATTORNEYS

Reissued Dec. 26, 1933

Re. 19,037

UNITED STATES PATENT OFFICE 19,037

REFRIGERATOR CABINET

Frank R. West, Detroit, Mich., assignor to Westinghouse Electric & Manufacturing Company, East Pittsburgh, Pa., a corporation of Pennsylvania Original No. 1,932,003, dated October 24, 1933, Serial No. 671,444, May 17, 1933. Application for reissue October 25, 1933. Serial No. 695,192

12 Claims. (Cl. 62—89)

This invention relates to refrigerator cabinets, and more particularly with that type of cabinet used in connection with domestic refrigerators.

In the use of refrigerator cabinets, particularly those of the domestic single door type, it becomes necessary, in transferring food from one shelf to another, or from the kitchen table or kitchen sink to the food compartment, to leave the door open for a relatively long period of time. It is well known that any opening of a refrigerator door for a period longer than two or three seconds results in a material loss in thermal efficiency and other severe strain upon the refrigerating apparatus.

It is the object of the present invention to provide a combined tray and shelf located adjacent the bottom of the food compartment, and adapted to receive a plurality of objects for transference from or to the refrigerator shelves or to receive objects to be transferred from one shelf to another. This not only results in materially reducing the period of door opening and thus greatly increasing the over all efficiency, but the positioning of the combined tray and shelf so that it extends in front of and at the bottom of the food compartment materially assists in keeping the articles of food on the shelf in refrigerated condition as long as possible, because when the door is opened the cold air rushes directly out over the objects positioned on the combined tray and shelf.

Other objects of the invention include structural details having to do with the positioning and design of the combined tray and shelf.

Figure 1:
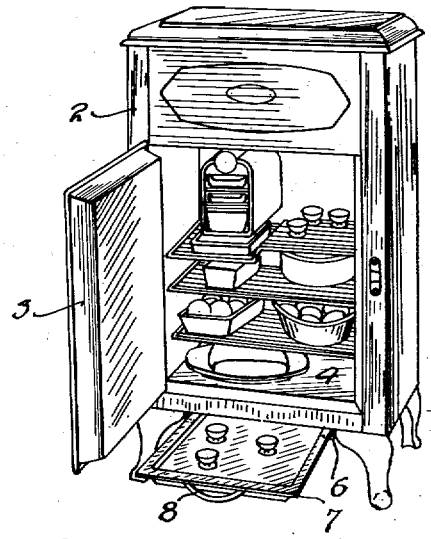
Fig. 1 is a perspective view of a domestic refrigerator showing one type of combined tray and shelf slidably mounted on the bottom of and between the legs.

It will be understood that the present invention may be adapted for use in combination with many different types of refrigerator cabinets, the particular embodiment shown in the drawings being in connection with cabinets of the domestic refrigerator type.

In Fig. 1 I have shown a domestic refrigerator 2 of the type having the refrigerating apparatus located in a compartment above the food chamber. It will readily be apparent that because of the relatively great temperature differential between the food chamber and the outside air, that opening of the door 3, as shown, for any length of time will cause rapid heat exchange between the room and the food compartment and heavy strain upon the refrigerating apparatus. The carrying of even one or two articles from the refrigerated shelf 4 to a kitchen table or sink often requires that the door be left open for several seconds, usually over three seconds. Ofttimes the housewife wants an article or articles positioned at the rear of a shelf, or, again, it is often desirable to transfer articles of food from one shelf to another for faster cooling or slower cooling, or for other reasons. During such transference, the door usually remains open for a considerable length of time, and during this time the cold air is dropping out of the bottom and the warm air is rushing in at the top of the food compartment.

To reduce the necessary door opening time to a minimum and to make use of the cold air being forced outwardly and downwardly from the food compartment, I have provided supports or guides 6 secured to the bottom of the refrigerator cabinet, and usually between the legs of such cabinet, for receiving a combined tray and shelf 7, provided with handles 8. In use, the tray 7 may be moved outwardly before, or simultaneously with the opening of the door, and in case containers or articles of food are to be carried to the kitchen table or to any other fairly remote point, they may be loaded onto the tray 7 the door immediately closed, and such containers or articles of food carried to the desired point on the tray. Or, again, if it is merely desired to transfer certain articles of food from one shelf to another, it is only necessary to slide out the tray and use the same as a shallow intermediary surface to effect quick transfer and allow for a minimum opening of the door, the articles of food being continuously refrigerated and the cold air being forced out of the refrigerator while the door is open. Again, if it is desired to transfer a plurality of articles, such as jellos and the like, to the refrigerator shelves from the kitchen table, it is only necessary to load the same onto the tray, place the tray in the position shown in Fig. 1, open the door and then quickly transfer the articles to the desired places, the articles being slightly precooled by the outrushing cold air during the shelf loading process.

Figure 3:
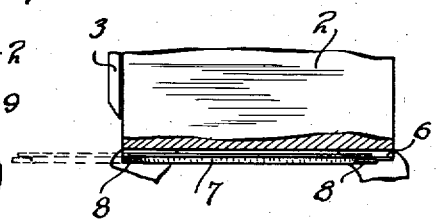
Fig. 3 is a fragmentary view, partially in section, of the manner of mounting the form of combined tray and shelf as shown in Fig. 1.

As best shown in Fig. 3, the combined tray and shelf 7 is provided with handles 8 at either end and the entire tray is slidably removed to a concealed position below or to a position in front of the food chamber.

Figure 4:
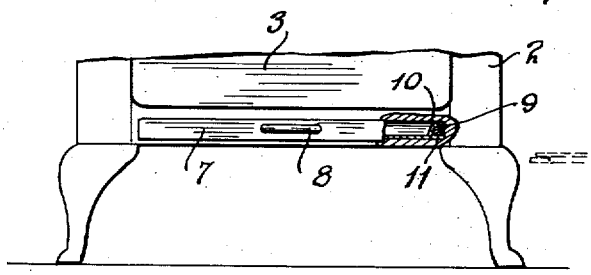
Fig. 4 illustrates a modified manner of mounting the combined tray and shelf at the base of the refrigerator cabinet.

In Fig. 4, the tray 7 is shown as being positioned in a compartment 9 formed in the cabinet itself. In this case the edges of the tray are preferably curled over as at 10 to cooperate with supporting members or guides 11 extending from the side walls of the compartment 9. This facilitates easy slidability without binding.

Figure 2:
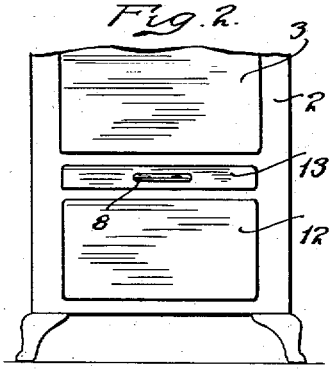
Fig. 2 is a front elevation illustrating the preferred adaptation and position of the combined tray and shelf to a refrigerator of the type wherein the refrigerating unit is mounted in a compartment below the food compartment.

In the modification shown in Fig. 2 the machinery compartment 12 is shown positioned beneath the food compartment and in this case the combined tray and shelf 13 is positioned intermediate the food compartment and the machinery compartment.

Figure 5:
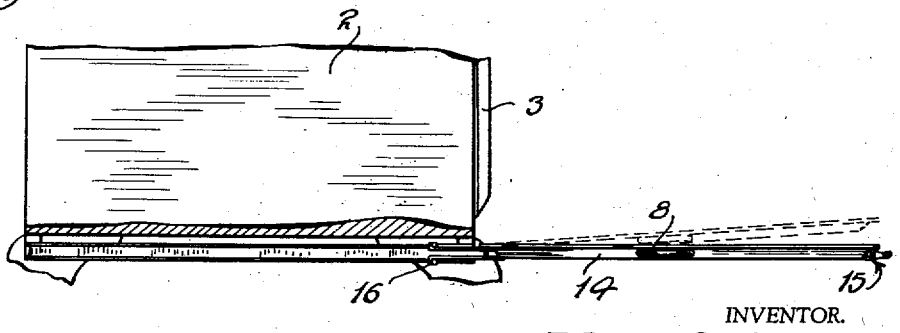
Fig. 5 illustrates a slightly modified form of tray and shelf structure wherein the tray itself is carried by a slidable frame.

In Fig. 5 the tray 14 is shown as being supported by a suitable frame 15 which is permanently mounted in or at the bottom of the cabinet and is limited as to upward movement by a suitable stop arrangement.

In using the word "shallow" in the specification and claims in connection with the shelf or tray, it will be understood that I am using this word only to define the thinness or lack of depth of such tray or shelf.

What I claim is:

1. In a refrigerator cabinet of the type having a food compartment and a door for normally closing the entrance to said food compartment, a combined shallow transfer shelf and tray slidably carried by the cabinet and movable when in use to a position at the front of and adjacent the bottom of the food compartment whereby when the door is opened the refrigerated air from the food compartment will be forced across the surface of the transfer shelf and tray.

2. In a refrigerator cabinet of the type having a food compartment and a door for normally closing the entrance to said food compartment, the combination of a shallow transfer shelf and tray carried by the cabinet and movable when in use to a position at the front of and adjacent the bottom of the food compartment whereby when the door is opened the refrigerated air from the food compartment will be forced across the surface of the transfer shelf and tray.

3. In a refrigerator cabinet, the combination of a food compartment and a closure member therefor, means for cooling and setting up a circulation of air currents within the compartment, and a shallow shelf slidably carried by and normally substantially concealed by the cabinet, said shelf being positioned adjacent the bottom of the food compartment and movable to a position forwardly thereof to receive articles for transference to and from the food compartment, the articles on the shelf being subjected to a forced draft of refrigerated air from the food compartment while the closure member remains open.

4. In a refrigerator cabinet of the type having a food chamber, means for refrigerating and for causing circulation of air within the chamber, a closure therefor, a frame slidably carried by the cabinet and extensible to a position in front of and below the food compartment, and a shallow tray member removably carried by the frame for receiving articles for transference from and to the food compartment.

5. A refrigerating unit comprising a cabinet, a food compartment having means for refrigerating and for causing circulation of air therein, a closure member for the compartment, and a shallow tray movable to a position in front of the food compartment when the closure member is open, said tray receiving articles for transference from or to the food compartment and positioned to directly receive refrigerated air forced from the compartment when the closure member is open.

6. In a refrigerator of the type having a food compartment a closure member therefor and a machine compartment positioned below the food compartment, the combination of a shallow shelf slidable within an opening formed in the cabinet and positioned between said two compartments, said shelf being adapted to receive articles for transference from or to the food compartment, said closure member being movable independently of the shelf whereby the closure member may be closed while the articles are still supported by the shelf.

7. In a refrigerator of the type having a food compartment, a closure member therefor, and a machine compartment positioned below the food compartment, the combination of a shallow shelf slidable within an opening formed in the cabinet and positioned between said two compartments, said shelf being adapted to receive articles for transference from or to the food compartment and being positioned at such a distance below the bottom of the closure member as to permit opening and closing of said closure member while articles are still positioned on the shelf.

8. In a mechanical refrigerator of standard dimensions and of the type having a food compartment, a closure member therefor, and a machine compartment positioned below the food compartment, the combination of a shallow frame member slidable within an opening formed in the narrow portion between the two compartments, and a shallow serving tray removably carried by the frame for receiving articles for transference from and to the food compartment and for moving said articles as a group to a point remote from the refrigerator, said shallow frame and tray being positioned at such a point below the closure member as to permit opening and closing thereof while the frame and tray are in extended position and have articles thereon.

9. In a refrigeration apparatus, the combination of a refrigerator cabinet including a food storage compartment and an access door for said compartment, means for causing circulation of refrigerated air in the food storage compartment, and a combined support and detachable transfer tray supported by the cabinet and movable to a readily accessible position for the transference of articles to and from the food storage compartment.

10. In refrigerating apparatus, the combination of a refrigerator cabinet including a food storage compartment and an access door for said compartment, means for causing circulation of refrigerated air in the food storage compartment, and a combined support and detachable transfer tray supported by the cabinet and movable to a readily accessible position adjacent the front thereof for the transference of articles to and from the food storage compartment.

11. In refrigerating apparatus, the combination of a refrigerator cabinet including a food storage compartment and an access door for said compartment, means for causing circulation of refrigerated air in the food storage compartment, and a combined support and detachable transfer shelf supported by the cabinet and movable to a readily accessible position adjacent the front thereof when the door is open, for the transference of articles to and from the food storage compartment.

12. In refrigerating apparatus, the combination of a refrigerator cabinet including a food storage compartment and an access door for said compartment, means for causing circulation of refrigerated air in the food storage compartment, and a combined support and detachable transfer tray supported by the cabinet adjacent the front thereof and movable to a readily accessible operative position for the transference of articles to and from the food storage compartment.

FRANK R. WEST.